(12) United States Patent
Reymonet

(10) Patent No.: US 6,277,179 B1
(45) Date of Patent: Aug. 21, 2001

(54) AGGLOMERATES BASED ON ACTIVE CHARCOAL, THEIR PROCESS OF PREPARATION AND THEIR USE AS ADSORPTION AGENTS

(75) Inventor: Jean-Louis Reymonet, Paris (FR)

(73) Assignee: Ceca S.A. (FR)

( * ) Notice: Subject to any disclaimer, the term of this patent is extended or adjusted under 35 U.S.C. 154(b) by 0 days.

(21) Appl. No.: 09/338,582

(22) Filed: Jun. 23, 1999

(30) Foreign Application Priority Data

Jun. 23, 1998 (FR) .................................................. 98 07910

(51) Int. Cl.$^7$ .................................................. B01D 53/04
(52) U.S. Cl. ................. 96/153; 95/901; 55/523; 55/524; 55/DIG. 5
(58) Field of Search ........................ 95/143, 901; 96/108, 96/153, 154; 55/523, 524, DIG. 5

(56) References Cited

U.S. PATENT DOCUMENTS

| | | | |
|---|---|---|---|
| 3,645,072 | * 2/1972 | Clapham | 96/153 |
| 3,919,369 | * 11/1975 | Holden | 96/153 X |
| 3,960,761 | 6/1976 | Burger et al. | 252/421 |
| 4,051,098 | 9/1977 | Takemura et al. | 260/38 |
| 4,664,683 | * 5/1987 | Degen et al. | 55/524 X |
| 4,665,050 | * 5/1987 | Degen et al. | 55/524 X |
| 4,677,086 | * 6/1987 | McCue et al. | 96/153 X |
| 5,033,465 | * 7/1991 | Braun et al. | 55/524 X |
| 5,160,352 | * 11/1992 | Najjar et al. | 55/524 X |
| 5,256,476 | * 10/1993 | Tanaka et al. | 55/524 X |
| 5,510,063 | * 4/1996 | Gadkaree et al. | 95/901 X |
| 5,656,069 | * 8/1997 | Nikolskaja et al. | 95/901 X |
| 5,665,148 | * 9/1997 | Mühlfeld et al. | 55/524 X |
| 5,731,260 | 3/1998 | Abell | 502/416 |

FOREIGN PATENT DOCUMENTS

| | | |
|---|---|---|
| 1 567 491 | 4/1969 | (DE) . |
| 4241 605 A1 | * 6/1994 | (DE) ................................ 96/154 |
| 0 278 061 | 8/1988 | (EP) . |
| 0 379 378 B1 | 7/1990 | (EP) . |
| 1397950 | 8/1965 | (FR) . |
| 2103348 | 4/1972 | (FR) . |
| 2215461 | 8/1974 | (FR) . |
| 2219114 | 9/1974 | (FR) . |
| 2228031 | 11/1974 | (FR) . |
| 1364421 | 8/1974 | (GB) . |
| 1398466 | 6/1975 | (GB) . |
| 1420479 | 1/1976 | (GB) . |
| 9-156914 | 6/1997 | (JP) . |

OTHER PUBLICATIONS

Abstract of Japan 9156914—13 Jun. 17, 1997.

* cited by examiner

Primary Examiner—Robert H. Spitzer
(74) Attorney, Agent, or Firm—Millen, White, Zelano & Branigan, P.C.

(57) ABSTRACT

Agglomerates based on active charcoal and on binder exhibit a good resistance to disintegration in a liquid medium as well as an excellent resistance to crushing and an excellent thermostability up to 350° C. They are prepared by mixing active charcoal powder with a pore-protecting agent in gel form and then mixing with a binder, followed by the agglomeration, shaping and curing of the agglomerates obtained. They can be used as adsorption agents for the treatment, for the seperation or the purification of gases, and for the decoloration, purification and deodorization of liquids.

26 Claims, No Drawings

AGGLOMERATES BASED ON ACTIVE CHARCOAL, THEIR PROCESS OF PREPARATION AND THEIR USE AS ADSORPTION AGENTS

FIELD OF THE INVENTION

The invention relates to the field of active charcoals and more particularly active charcoals agglomerated with a binder.

BACKGROUND OF THE INVENTION

Active charcoals are products resulting from the carbonization of various carbonaceous materials, wood, coal or polymers, which have been subjected to an activation treatment which confers on them a high porosity and a high adsorbent power. These adsorbent properties have been exploited for a long time for the treatment, separation and purification of gases and for the decoloration, purification and deodorization of liquids.

When they are brought into contact with liquids in non-continuous processes, they are generally used in the form of powders, with a mean particle size generally of less than 100 μm, because the powders make it possible to achieve an active charcoal/liquid intimate contact which is very efficient. In percolation treatment processes, however the active charcoal is instead used in the form of rods or granules, in order to avoid any untimely movement of the adsorbent layer.

When the active charcoal is brought into contact with gases (adsorbent beds), excessively fine particle sizes are avoided, otherwise, the pressure drop would be excessively high and the risks of blockage of the equipment, would be increased.

It is possible to prepare the active charcoal by the action of a dehydrating and/or oxidizing agent (phosphoric acid, zinc chloride) on ligneous materials, (such as wood, coconut shells or coal), the operation being carried out without prior carbonization at a relatively low temperature (less than 600° C.), the chemical substance subsequently being removed from the active charcoal by successive washing operations and, if necessary, grinding to the desired particle size. The active charcoals thus obtained (so-called chemical charcoals) exhibit a good porosity but their mechanical characteristics, which are often too weak (excessively friable grains), limit their use in the treatment of gaseous phases.

One method for the preperation of agglomerated active charcoal consists in mixing a hydrocarbonaceous material, such as coal, peat, peat coke, semicoke or wood charcoal, with coal pitch, coal tar, wood pitch or wood tar, in then agglomerating the mixture by compacting and, finally, in crushing it or extruding it through a die to the desired particle size. The agglomerated products are subsequently devolatiled at a temperature of 400–600° C. before activation by gasification in an oxidizing atmosphere (steam, $CO_2$ or $H_2O/CO_2$ mixture). If the starting hydrocarbonaceous material is composed of fruit shells, for example coconut shells, it is not necessary to mix them with pitch or tar before the devolatilization and activation stages because grains in the desired particle size range, typically of the order of a mm, are obtained by simple crushing (the active charcoals prepared according to the latter method are so-called physical charcoals). The porosity of the active charcoal is created during the activation stage (with the consumption of carbon), which porosity goes together with the weakening of the skeleton of the graing, thus resulting in a significant loss of mechanical properties (decrease in the resistance to crushing, increase in the friability).

Provision has also been made to prepare agglomerated active charcoal by agglomerating active charcoal powder with peptized alumina or else with certain clays; once the active charcoal powder has been mixed with the alumina or the clay, the mixture is extruded and then subjected to baking at a temperature of between 450 and 600° C. As it is known that, at such temperatures, active charcoal is capable of being consumed on contact with air or oxidizing fumes (used in direct heating furnaces), it is essential to maintain the above-described mixture under a neutral atmosphere, which increases the cost of this agglomeration method.

The active charcoal agglomeration process disclosed in FR 2,228,031 consists in mixing a finely divided carbonaceous material (with a particle size of less than 0.075 mm) with a thermosetting binder based on phenol/aldehyde resin and/or their condensation products, optionally in the presence of a crosslinking agent, in then moulding the mixture, in crosslinking the binder under hot conditions and, finally, in activating the thus agglomerated carbonaceous material.

Provision has been made, in FR 2,215,461, to agglomerate active charcoal powder with a thermosetting binder, which can be chosen from phenol-formaldehyde resins, furan resins or urea-formaldehyde resins, and then to shape the mixture, before carrying out a heat treatment, so as to cure the binder.

During the shaping of the agglomerates from powdered active charcoal and from a binder (thermosetting binder, pitch, tar, and the like) according to the prior art, it is found that a not insignificant part of the binder enters inside the pores, decreasing the activity of the active charcoal thus prepared.

In JP09-156,914 is disclosed a process for agglomerating an active charcoal powder with a binder, whereas prior to the agglomeration step, the active charcoal is brought into contact with a liquid pore-protecting agent selected from water, higher alcohols, fatty acids, oil/fats and plasticizers. The agglomerates that are obtained have a poor resistance to crushing.

SUMMARY OF THE INVENTION

The agglomeration process provided herein makes it possible to obtain active charcoal agglomerates with a particle size of between 0.2 and 10 mm, preferably between 0.4 and 6 mm, possessing not only good mechanical properties (resistance to crushing and to disintegration, low friability) but also an excellent adsorbent activity; this process exhibits the additional advantage of being easy to implement and inexpensive.

The process for agglomeration of active charcoal with a binder according to the invention comprises the following stages:

(a) mixing active charcoal powder with a pore-protecting agent in a sufficient amount for the mixture to remain pulverulent, (b) mixing the product resulting from (a) with a binder, (c) agglomerating and shaping the mixture resulting from (b), (d) curing the agglomerated products.

Use may be made, as pore-protecting agent, of aqueous or organic gels. Mention will very particularly be made, among aqueous gels, of those based on smectic clay and in particular on bentonite, as well as gels based on organic gelling agents, such as alginates, carrageenans and/or pectins. It is believed that the pore-protecting agent blocks all or part of the entry of the pores of the active charcoal before it is brought into contact with the binder.

The active charcoal powder which is mixed with the pore-protecting agent has a mean particle size generally of between 1 and 100 µm. If active charcoal particles with a greater particle size are available, care will be taken to grind these particles so that their mean particle size is preferably between 1 and 100 µm before mixing them with the pore-protecting agent.

The stage of mixing the active charcoal powder and the pore-protecting agent (stage (a)) is generally carried out at ambient temperature. Use may be made of any known type of mixing device, such as Z-arm mixer, ribbon blender or mixing edge runner. A sufficient amount of pore-protecting agent(s) is employed for the mixture obtained to be in the pulverulent form. The proportions of pore-protecting agent and of active charcoal powder are generally between 100 and 200 parts by weight of protecting agent per 100 parts by weight of active charcoal.

As indicated above, the mixture resulting from the stage (a) is subsequently mixed with the binder (stage (b)).

Binders within the meaning of the present invention is understood to mean more particularly thermosetting binders and hot-melt binders.

The thermosetting binders are compositions based on thermosetting resins which are liquid or solid at ambient temperature and in particular those of urea-formaldehyde, melamine-urea-formaldehyde or phenol-formaldehyde type, resins of melamine-urea-formaldehyde type being preferred as well as emulsions of thermosetting (co)polymers in the latex foam. Crosslinking agents can be incorporated in the mixture. Mention may be made, as example of crosslinking agents, of ammonium chloride.

The hot-melt binders are generally solid at ambient temperature and are based on resins of hot-melt type.

Use may also be made, as binders, of pitch, tar or any other known binder which is solid at ambient temperature and which cannot degrade during the various stages of the agglomeration process of the present invention.

The proportions of binder and of active charcoal powder can generally be between 4 and 30 parts by weight of binder, preferably between 10 and 20 parts by weight, per 100 parts by weight of active charcoal.

In the case where a thermosetting binder is employed, it is added, as well as the optional crosslinking agent, to the mixture of active charcoal powder and of pore-protecting agent generally at ambient temperature (stage (b)). Use may be made of any known type of mixing device, such as Z-arm mixer, ribbon blender or mixing edge runner. It may be necessary to add water in order for the consistency of the mixture to be such that it can be shaped directly as agglomerated product according to any known technique, such as extruding, compacting, pelleting, rolling, granulating with a rotating pan, and the like, by means of any known type of equipment (stage (c)). After the shaping stage, the binder (and the agglomerated products) are cured, for example by heating at temperatures generally below 200° C. (stage (d)).

In the case where a hot-melt binder is employed, it is, after optional grinding, dry mixed with the mixture of active charcoal powder and of pore-protecting agent (stage (b)). The mixture is then heated, so as to soften it to the viscosity desired for it to be shaped as grains, extrudates, slabs, and the like, by means of any known type of equipment (stage (c)). It is also possible to soften the hot-melt binder alone and then to incorporate the active charcoal, which has been mixed beforehand with the pore-protecting agent, in the softened mass and to shape as grains, extrudates, slabs, and the like. When the agglomerated products are cooled to ambient temperature (stage (d)), they are completely rigid.

Another subject-matter of the present invention is the agglomerated products or agglomerates which can be obtained according to the agglomeration process described above. Depending on the processing technique employed, they are provided in the form of grains, extrudates, pellets, slabs, beads, and the like.

With respect to the agglomerated products of the prior art, the agglomerates according to the invention exhibit an improved adsorption capacity and, furthermore, it is unexpectedly found that their resistance to crushing is also improved.

Their mean particle size is generally between 0.2 and 10 mm and preferably between 0.4 and 6 mm.

They exhibit an improved resistance to disintegration in liquid medium with respect to the agglomerated grains of active charcoal of the literature and their resistance to crushing is between 1 and 10 kg for particle sizes of between 1 and 4 mm. Depending on the nature of the binder used, they can withstand temperatures which can range up to 350° C.

The agglomerated active charcoals of the present invention can be used like known agglomerated active charcoals. Given their very good mechanical properties and their excellent adsorption capacity, they are particularly recommended in industrial processes for the adsorption of gases in the form of an adsorbent bed.

They are particularly suited as agents for the adsorption of hydrocarbon vapors and in particular of vapors composed mainly of n-butane and/or of pentane. The industrial processes for the adsorption of these hydrocarbon vapors are known as VRU (abbreviation for Volatile Recovery Unit) and are of PSA (pressure-swing adsorption) or VSA (PSA under reduced pressure) type.

The agglomeration process of the present invention is also suited to any porous pulverulent material which it is desired to agglomerate. Mention may be made, among these porous pulverulent materials, of silica powders, zeolite powders and thermoplastic resin or thermosetting resin powders, such as the porous spheroidal polyamide particles prepared by anionic polymerization of lactams and/or of amino acids, such as the powders sold by the company Elf Atochem S.A. under the tradename Orgasol®.

For powders based on hydrophilic zeolite which it is desired to agglomerate, care will be taken to choose an organic-based protecting agent.

For powders based on polymeric resins or materials which it is desired to agglomerate, care will be taken to choose a binder for which the curing temperature, if it is thermosetting, or softening temperature, if it is hot-melt, is less than the melting, softening or crosslinking temperature of the resin to be agglomerated.

EXAMPLES

For the products prepared in the examples below, the relative density of the tapped product, the butane adsorption capacity and the resistance to crushing are measured and a disintegration test is carried out according to the procedures below:

Relative density of the tapped product

A 100 ml graduated measuring cylinder is installed on a tapping device comprising a stationary base which carries three rollers, on which rollers rests a moving steel plate equipped with three saw teeth. This plate, which can move vertically by sliding along an axis, receives a rotational movement of 60 rev/min from an endless screw. While turning round on itself, the plate is subjected to a series of rises, followed by abrupt falls with a height of 4 mm. The measuring cylinder is continuously filled by hand with the product for which it is desired to measure the relative density (placed beforehand in an oven brought to 150° C. until its weight no longer varies) until the "100 ml" (V) graduation is reached after 3 min. The contents of the measuring cylinder are then weighed (W) and the tapped relative density=W/V is calculated.

Disintegration test 3 agglomerates are placed in 200 ml of water in a 250 ml beaker and the time necessary for their complete disintegration on agitating the mixture every 30 s is measured.

Butane working capacity

Approximately 10 g of active charcoal are dried in an oven at 150° C. until there is no longer any variation in weight of the sample and then it is cooled to ambient temperature in a desiccator. A U-shaped tube, equipped with a sintered glass No.0 and with a filling volume FV of between 15.9 and 16.9 ml and which has been tared beforehand (W0), is subsequently filled with the heated and dried active charcoal, which tube is weighed (W1) and tapped for 2 min using the tapping device used to measure the relative density of the tapped product. A stream of butane, the flow rate of which is adjusted to 15 l/h, is subsequently passed through from the top downwards for 45 min, the temperature of the tube being maintained at 25° C. The tube is dried and weighed (W3).

A stream of nitrogen is subsequently passed from the top downwards for 1 h over the active charcoal maintained at 25° C. (nitrogen flow rate: 18 l/h). The tube is dried and weighed (W4) and the following are calculated:

the butane working capacity BWC according to the equation:

$$BWC(g/cm^3)=(W3-W4)/FV \times 100$$

the butane number BN according to the equation:

$$BN(mg/g)=(W3-W1)/(W1-W0) \times 1000$$

Resistance to crushing

The breaking load (expressed in kg) of an agglomerated product subjected to an increasing pressure is measured using a device for measuring the resistance to crushing of Indelco-Chatillon (ADS/801) type equipped with a TCM 200 support and with a DFGS 50 dynamometer, the rate of descent of which is adjusted to 23 mm/min. The mechanical resistance to crushing R is defined by the arithmetic mean of 25 measurements.

Example 1 (Comparative)

400 g of powdered active charcoal, sold by the Company Ceca S.A. under the name Acticarbone® CP, with a mean particle size of 20 μm, are mixed with a solution of 80 g of melamine-urea-formaldehyde resin, sold by the company Chemie-Linz under the tradename S100, dissolved in 500 g of water, using a Z-arm Werner mixer. 8 g of ammonium chloride $NH_4Cl$ (crosslinking catalyst) are added.

A homogeneous paste is obtained which is shaped as extrudates by extrusion using an extrusion press equipped with a die pierced with holes with a diameter of 3 mm.

The curing of the binder is obtained by heat treatment in an oven at 120° C. for 3 h.

The extrudates obtained exhibit the following characteristics:

| | |
|---|---|
| Tapped bed relative density | 0.29 g/cm³ |
| Butane adsorption capacity | 8 g/100 cm³ |
| Resistance to crushing | 4 kg |

Example 2

A bentonite (sold under the tradename Clarsol® FGN/FR4 by the Company Ceca S.A.) suspension is prepared by dispersing 15 g of bentonite in 550 g of water with stirring.

The suspension thus obtained is mixed in a Z-arm Werner mixer with 400 g of Acticarbone® CP active charcoal.

When the mixture is homogeneous, 80 g of S100 melamine-urea-formaldehyde resin and 8 g of $NH_4Cl$ are introduced.

Carboxymethylcellulose is added as extrusion adjuvant.

When the paste is homogeneous, extrusion is carried out using a Kahl mixing edge runner equipped with a die with a diameter of 3 mm and then a heat treatment is carried out for 3 hours in an oven at 120° C.

The extrudates obtained have a butane adsorption capacity of 8.4, a resistance to crushing of 5.9 kg and a relative density of 0.32.

Example 3 (Comparative)

The preparation is carried out as in the preceding example but using water instead of the bentonite suspension as pore-protecting agent.

The extrudates obtained have a butane adsorption capacity of 8.1, a resistance to crushing of 5 kg and a relative density of 0.30.

Example 4 (Comparative)

The mixing is carried out as in Example 3 but the extrusion is carried out with a 2 mm die.

After a heat treatment of 4 h at 120° C., extrudates are obtained which have a butane adsorption capacity of 8.5, a resistance to crushing of 2.6 kg and a relative density of 0.31.

Example 5

The preparation is carried out as in the preceding example but replacing water (pore-protecting agent) with the bentonite suspension of Example 2.

Extrudates are thus obtained having an adsorption capacity of 8.9, a resistance to crushing of 4.6 kg and a relative density of 0.32.

Examples 2 and 3, on the one hand, and 4 and 5, on the other hand, demonstrate the improvement introduced by the use of bentonite with respect to the adsorption capacity and the resistance to crushing.

Example 6

A suspension of 12.5 kg of Clarsol FGN/FR4 bentonite in 255 liters of water is prepared. 300 kg of Acticarbone CP active charcoal are moistened with 240 liters of water in a ribbon blender of Gondard trademark and then the bentonite suspension is added; after mixing for 10 minutes, 25 kg of S100 melamine-urea-formaldehyde resin are introduced, followed by 25 liters of a 10% by weight ammonium chloride solution and, finally, the extrusion adjuvant (carboxymethylcellulose).

After mixing for 10 minutes, extrusion is carried out at 3 mm using a Hobart® extruder.

The heat treatment is carried out in a horizontal rotary furnace with a length of 8 m and a diameter of 1 m, with a rotational speed of 2 rev/min and an inlet temperature of the hot gases of 450 to 550° C. The evaporation of the water contained in the product limits its temperature to 130–150° C.

Extrudates are obtained for which the butane adsorption capacity is 9, the resistance to crushing 4 kg and the relative density 0.36.

Example 7

400 g of Acticarbone CP active charcoal are mixed with a suspension of 15 g of bentonite in 550 g of water and then 40 g of S100 melamine-urea-formaldehyde resin and 4 g of ammonium chloride are added, as well as an extrusion adjuvant.

Extrusion is carried out using a Pinette-Emidecau ram press equipped with a 3 mm die.

After heat treatment for 4 hours at 120° C., extrudates are obtained which have an adsorption capacity of 9.4, a resistance to crushing of 5 kg and a relative density of 0.31.

Example 8

The preparation is carried out as in the preceding example but with only 24 g of melamine-urea-formaldehyde resin and 2.5 g of ammonium chloride.

The product obtained has a butane adsorption capacity of 10.7, a resistance to crushing of 4.5 kg and a relative density of 0.30.

Example 9

A mixture is prepared as described in Example 2; when the paste is homogeneous, it is gradually poured into a granulation pan which allows agglomeration to take place in the form of beads.

The device used here, of trademark Eirich®, has a diameter of 0.4 m and its rotational speed and its inclination are adjusted in order to allow the formation of beads with a diameter of 1.5 to 3 mm; after heat treatment, these beads have an adsorption capacity of 9.5 and a resistance to crushing varying from 0.5 to 1 kg, depending on their diameter.

Example 10

850 g of Acticarbone® CP active charcoal are mixed with a 30 g/l aqueous bentonite suspension; 150 g (expressed on a dry basis) of an emulsion based on copolymerized acrylic esters, sold under the tradename Repolem 1103 K by the Company Elf Atochem S.A., are added to the pulverulent mixture obtained; extrusion is carried out at 3 mm with a ram extrusion press at 150° C. and drying is carried out in an oven in order to remove the residual water.

A product is obtained with a butane adsorption capacity of 8.7.

Example 11

The preceding formulation is compacted for 5 minutes at 175° C. under 150 bar in a ram press. The block obtained is subsequently crushed under cold conditions and sieved, in order to obtain a fraction with a particle size of between 0.5 and 2 mm.

This crushed and sieved product has a butane adsorption capacity of 8.7.

Example 12

The formulation of Example 11 is compacted under 1000 bar at 150° C.

The 0.5/2 mm fraction obtained after crushing and sieving the compressed block has a butane adsorption capacity of 10.

All the agglomerated products prepared according to Examples 1 to 12 are subjected to the test of disintegration with water: none of the products of Examples 2 to 12 disintegrates, whereas the sample of Comparative Example 1 disintegrated.

Example 13

The adsorption capacity of 3 active charcoals for n-butane is measured:

a) the agglomerated active charcoal of Example 6 b) SA 1810 is an active charcoal in the form of granules with a mean diameter of 1 mm prepared from chemically activated pinewood (BWC: 10.5; relative density: 0.22 g/ml; BN: 514)

c) GAC 4×8 is an active charcoal agglomerate in the form of granules with a mean diameter of 3.3 mm prepared from coal and physically activated (BWC: 5.8; relative density: 0.43 g/ml; BN: 242).

The operation is carried out according to a process of VSA (pressure-swing adsorption) type with adsorption at atmospheric pressure and desorption under vacuum.

The adsorber is a column with a height of 1.5 m and a diameter of 5 cm in which are charged 3 l of one of the 3 active charcoals described above.

Adsorption and desorption are linked together cyclically according to the conditions set out below:

adsorption direction of passage of the gases in the column: from the bottom upwards duration 15 min pressure of the gases 0.1 MPa temperature of the gases 25° C. composition of the gases: 40 parts by volume of n-butane and 100 parts by volume of nitrogen speed of the gases 0.02 m/s desorption direction of passage of the gases in the column: from the top downwards duration 15 min pressure of the gases 0.01 MPa temperature of the gases 25° C. composition of the gases (purge gas) pure nitrogen total gas flow rate (purge gas) 4 Sl/h The number of adsorption/desorption cycles necessary for the butane gas front to exit from the column is measured. The results are combined in Table 1.

TABLE 1

| Type of agglomerate | a | b | c |
|---|---|---|---|
| Number of cycles necessary for the emergence of the front | no emergence at the 80th cycle | no emergence at the 80th cycle | 35 cycles |
| Mass of butane recovered (g) | 3867 | 3867 | 1692 |

Example 14

The operating conditions of Example 13 are again taken, with the exception

* of the desorption pressure, which is set at 0.02 MPa.

The number of adsorption/desorption cycles 10 necessary for the butane gas front to exit from the column is measured. The results are combined in Table 2.

TABLE 2

| Type of agglomerate | a | b | c |
|---|---|---|---|
| No. of the cycle at which the emergence of the front takes place | 24th cycle | 14$^{th}$ cycle | 12th cycle |
| Volume of butane recovered (l) | 480 | 280 | 240 |
| Mass of butane recovered (g) | 1160 | 677 | 580 |

Example 15

The operating conditions of Example 13 are again taken, with the exception of the speed of the gases during the adsorption: 0.03 m/s and of the purge flow rate during the desorption phases: 6 Sl/h.

The number of adsorption/desorption cycles necessary for the butane gas front to exit from the column is measured. The results are combined in Table 3.

TABLE 3

| Type of agglomerate | a | b | c |
|---|---|---|---|
| No. of the cycle at which the emergence of the front takes place | 28th cycle | 24th cycle | 9th cycle |
| Volume of butane recovered (l) | 1176 | 1050 | 378 |
| Mass of butane recovered (g) | 2842 | 2537 | 913 |

It is to be noted that the aqueous or organic gel has a concentration of gel-forming solids in the gel that permits the gel to form on standing generally at ambient temperature or lower. Additional information concerning gelation and gel structures can be found in the literature, for example, Hauser, "Colloidal Phenomena", First Edition, McGraw-Hill, 1939, pages 213–226.

The preceding examples can be repeated with similar success by substituting the generically or specifically described reactants and/or operating conditions of this invention for those used in the preceding examples. Also, the preceding specific embodiments are to be construed as merely illustrative, and not limitative of the remainder of the disclosure in any way whatsoever.

The entire disclosure of all applications, patents and publications, cited above and below, and of corresponding French application 98/07910, are hereby incorporated by reference.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. A process for the preperation of active charcoal agglomerates comprising:
   (a) mixing an active pore-containing charcoal powder with a binder and optionally a crosslinking agent;
   (b) agglomerates and shaping the mixture to form agglomerates products; and
   (c) curing the agglomerated products;
   characterized in that, prior to (a), the active charcoal powder is brought into contact with a pore-protecting agent chosen among aqueous or organic gels in a sufficient amount for the mixture to remain in a pulverized form and to yield an improved crushing strength of the product of step (c) as compared to the use of water as a pore-producing agent.

2. A process according to claim 1, characterized in that the proportions of the pore-protecting agent, being a slurry pore-protecting agent, and of the active pore-containing charcoal powder are between 100 and 200 parts by weight of protecting agent per 100 parts by weight of active charcoal.

3. A process according to claim 1 characterized in that the proportions of the binder and of the active pore-containing charcoal powder are between 4 and 30 parts by weight of the binder, per 100 parts by weight of the active pore-containing charcoal powder.

4. A process according to claim 1 characterized in that the mixing of the active charcoal powder and of the pore-protecting agent and the mixing with the binder and optionally the crosslinking agent are carried out at ambient temperature.

5. A process for the preparation of agglomerates of active charcoal and of binder according to claim 1, characterized in that the shaping of agglomerated product is carried out by extruding, compacting, pelleting, rolling or granulating with a rotating pan.

6. A process for the preparation of agglomerates of the active charcoal and of the binder according to claim 1, characterized in that the agglomerated product is cured by heating at a temperature sufficient to provide for the curing of the binder.

7. A process for the preperation of agglomerates from active charcoal, the pore-protecting agent and from a powdered hot-melt binder according to claim 1, characterized in that the powdered hot-melt binder is:
   either mixed with the active charcoal powder, which has been mixed beforehand with the pore-protecting agent, and then the combined mixture is headed and softened and then shaped and cooled;
   or heated and softened before being mixed with the active charcoal powder, which has been mixed beforehand with the pore-protecting agent, and then the combined mixture is shaped and cooled.

8. An agglomerate obtained according to the process as defined in claim 1.

9. An agglomerate according to claim 8, characterized in that the pore-protecting agent is a smectic clay or an organic gel.

10. An agglomerate according to claim 8, characterized in that the binder is a thermosetting resin which is liquid or solid at ambient temperature or an emulsion or a latex of (co)polymer(s).

11. An agglomerate according to claim 10, wherein the thermosetting resin is urea-formaldehyde, melamine-urea-formaldehyde or phenol formaldehyde.

12. An agglomerate according to claim 11, wherein the thermosetting resin is melamine-urea-formaldehyde.

13. An agglomerated according to claim 10, wherein the resin is melamine-urea-formaldehyde.

14. An agglomerate according to claim 8, characterized in that the binder is a hot-melt resin solid at ambient temperature, pitch or tar.

15. In an adsorption process for the separation and/or purification of gases, comprising contacting the gases with an adsorption agent, the improvement wherein the adsorption agent is an aggomerate according to claim 8.

16. An agglomerated according to claim 1, wherein said pore-protecting agent comprises bentonite, an alginate, a carrageenan or a prctin.

17. An agglomerate according to claim 16, wherein the pore-protecting agent comprises bentonite.

18. An agglomerate according to claim 17, wherein the binder comprises melamine-urea-formaldehyde.

19. An agglomerate according to claim 16, wherein the binder comprises urea-formaldehyde, melamine-urea-formaldehyde or phenol formaldehyde.

20. An agglomerate according to claim 16, wherein the binder comprises melamine-urea-formaldehyde.

21. An agglomerate comprising:
   at least one charcoal particle;
   a resin of urea-formaldehyde, melamine-urea-formaldehyde or phenol formaldehyde; and
   a pore-protecting agent of bentonite, an alginate, a currageenan, or a pectin.

22. An agglomerate according to claim 21, wherein the pore-protecting agent comprises bentonite.

23. An agglomerate according to claim 21, wherein the resin is melamine-urea-formaldehyde.

24. An agglomerate according to claim 21, having a mean particle size of 0.2–10 mm.

25. An agglomerate according to claim 21, having a mean particle size of 0.4–6 mm.

26. An agglomerate according to claim 21, wherein the proportions of the resin and of the at least one charcoal particle are between 4 and 30 parts by weight of the binder, per 100 parts by weight of the at least one charcoal particle.

* * * * *

UNITED STATES PATENT AND TRADEMARK OFFICE
CERTIFICATE OF CORRECTION

PATENT NO.   : 6,277,179 B1
DATED        : August 21, 2001
INVENTOR(S)  : Jean-Louis Reymonet It is certified that error appears in the above-identified patent and that said Letters Patent is hereby corrected as shown below:

Column 10, claim 1,
Line 6, reads "agglomerates" should read -- agglomerized --
Line 11, reads "pulverized" should read -- pulverulent --

Column 10, claim 7,
Line 7, reads "headed" should read -- heated --

Column 11, claim 16,
Line 1, reads "agglomerated" should read -- agglomerate --
Line 3, reads "prctin" should read -- pectin --

Signed and Sealed this

Second Day of April, 2002

Attest:

JAMES E. ROGAN
*Attesting Officer*   *Director of the United States Patent and Trademark Office*